United States Patent [19]

Matsuhashi et al.

[11] Patent Number: 4,917,468

[45] Date of Patent: Apr. 17, 1990

[54] DRIVE CIRCUIT FOR USE IN SINGLE-SIDED OR OPPOSITE-SIDED TYPE LIQUID CRYSTAL DISPLAY UNIT

[75] Inventors: Nobuaki Matsuhashi, Tenri; Makoto Takeda, Nara; Hiroshi Take, Ikoma, all of Japan

[73] Assignee: Sharp Kabushiki Kaisha, Japan

[21] Appl. No.: 939,720

[22] Filed: Dec. 9, 1986

[30] Foreign Application Priority Data

Dec. 9, 1985 [JP] Japan ............................... 60-277258

Dec. 10, 1985 [JP] Japan ............................... 61-278796

[51] Int. Cl.[4] ......................... G09G 3/18; G09G 3/36; G02F 1/133

[52] U.S. Cl. .................................... 350/332; 350/333; 340/805; 340/811

[58] Field of Search ................ 350/332, 333; 340/784, 340/718, 719, 802, 805, 811

[56] References Cited

U.S. PATENT DOCUMENTS

| | | | |
|---|---|---|---|
| 4,346,378 | 8/1982 | Shanks | 340/784 |
| 4,447,812 | 5/1984 | Soneda et al. | 340/784 |
| 4,602,292 | 7/1986 | Togashi et al. | 340/784 |
| 4,633,242 | 12/1986 | Sekiya | 340/719 |
| 4,651,148 | 3/1987 | Takeda et al. | 340/784 |
| 4,679,043 | 7/1987 | Morokawa | 340/784 |
| 4,682,858 | 7/1987 | Kanbe et al. | 350/350 S |
| 4,701,799 | 10/1987 | Yoshimura | 340/784 |
| 4,779,085 | 10/1988 | Mizutomo et al. | 340/784 |

FOREIGN PATENT DOCUMENTS

| | | | |
|---|---|---|---|
| 3314778 | 2/1985 | Fed. Rep. of Germany . | |
| 0158178 | 9/1984 | Japan | 340/784 |
| 0039618 | 3/1985 | Japan | 350/332 |

OTHER PUBLICATIONS

K. Kasahara, "A LCTV Display—with Gate Bus Drivers", pp. 96-101—IEEE—1980, (Oct. 1980).

The Kasahara et al. article, "A Liquid-Crystal Display Panel Using an MOS Array with Gate-Bus Drivers", (1981), IEEE.

"Flache Fernseh-Bildschirme Teil 1" by Albrecht Fischer, (1980).

*Primary Examiner*—Stanley D. Miller
*Assistant Examiner*—Tai V. Duong

[57] ABSTRACT

A drive circuit for use in a matrix type liquid crystal display unit having a liquid crytal display panel with switching elements for addressing. The switching elements are provided at picture elements disposed in a matrix type display pattern. The drive circuit includes a row electrode driver coupled not only with terminals of row electrodes provided at one side of the liquid crystal display panel but also to the terminals of the row electrodes provided at opposite sides of the liquid crytal display panel and a changeover terminal for enabling the row electrode driver to drive the terminals of the row electrodes provided at the one side of the liquid crystal display panel or to drive the terminals of the row electrodes provided at the opposite sides of the liquid crystal display panel.

6 Claims, 10 Drawing Sheets

93
Changeover Terminals (Right)
90
SP
CL
R/L̄
B/S̄
H2/H̄i
D/P̄
L̄ŌW̄
1
3
2n-3
2n-1
Row Electrode Driver (Right)
89
LCD Panel
2
4
2n-2
2n
91
Row Electrode Driver (Left)
92
Changeover Terminals (Left)
O
I

DRIVE CIRCUIT FOR USE IN SINGLE-SIDED OR OPPOSITE-SIDED TYPE LIQUID CRYSTAL DISPLAY UNIT

BACKGROUND OF THE INVENTION

The present invention generally relates to a matrix type liquid crystal display unit and more particularly, to a drive circuit for use in matrix type liquid crystal display unit, in which a switching transistor for addressing is provided at each of picture elements disposed in a matrix type display pattern.

Conventionally, as a matrix type liquid crystal display unit having non-linear elements used for performing display drive of liquid crystal, a TFT active matrix type liquid crystal display unit is known in which thin film transistors (referred to as "TFTs", hereinbelow) for addressing are incorporated, in a shape of a matrix, into a liquid crystal display panel such that display of high contrast equivalent to that of static drive can be obtained even in case where drive having a small duty ratio, i.e. multiplex drive of multiple lines is performed. For example, a known TFT active matrix type liquid crystal display unit has a circuit configuration of FIG. 1 and wave forms of signals of FIG. 2. The known TFT active matrix type liquid crystal display unit includes a liquid crystal display panel 11, a row electrode driver 12, a gate signal control unit 13, a column electrode driver 14 and a data signal control unit 15. In liquid crystal display panel 11, (as shown in the oval window) a TFT 11*c* is connected to a point of intersection between a row electrode 11*a* and a column electrode 11*b*. Reference numeral 11*d* denotes the capacitance of a liquid crystal layer. The above description is only an example of one of many display sites on the liquid crystal display panel. The row electrode driver 12 is mainly comprises a shift register which sequentially shifts a scanning pulse in response to a clock $\phi 1$ from the gate signal control unit 13 so as to output the shifted scanning pulse to each row electrode. Assuming that character T denotes a total scanning time period for scanning all the row electrodes and character N denotes the number of the row electrodes to be scanned, a scanning time period H for scanning each the row electrode, as represented by 11*a*, is expressed by the following equation.

$$H=T/N.$$

A voltage pulse having a pulse width equal to the scanning time period H is sequentially applied to each row electrode so as to turn on the TFTs one line by one line. The column electrode driver 14 is either the type in which data are directly sampled and held on the display panel 11, (referred to as "panel sample-and-hold drive type"), or the type in which the column electrodes have a function of sampling and holding data, (referred to as "driver sample-and-hold drive type".

As shown in FIG. 3, the column electrode driver of the panel sample-and-hold drive type is constituted by a shift register 31, sampling switches 32, etc. The column electrode driver samples synchronously with a clock $\phi 2$ at a timing corresponding to each column data transmitted in series from the data signal control unit 15 and outputs the sampled data to the column electrodes sequentially so as to write the outputted data on the liquid crystal layer through the TFTs. In the panel sample-and-hold drive type, the sampling of the data and the writing of the data on the liquid crystal layer through the TFTs are performed during the identical horizontal scanning time period.

The driver sample-and-hold drive type is described with reference to FIGS. 4 and 5. In the driver sample-and-hold drive type, the column electrode driver is constituted by a shift register 41, sampling switches 42, etc. The sampling switches 42 are turned on synchronously with output of the shift register 41 such that electric charges corresponding to the data signals are stored at capacitors as represented by 43, respectively. Subsequently, a discharge pulse signal disposed at an initial half of a horizontal blanking time period is applied to a line Cl so as to discharge remaining electric charge such that a base condition is formulated. Then, when a transfer pulse signal disposed at a last half of the horizontal blanking time period is applied to a line Cg, the electric charges stored at the capacitors are transferred to transistors as represented by 44, to be outputted. In the driver sample-and-hold drive type, the data are written on the liquid crystal layer during a time interval of the scanning time period H after sampling of the data.

In the case where the row electrodes are led from the liquid crystal display panel to the row electrode driver, there is one method shown in FIG. 1 in which all the row electrodes are led from one side of the liquid crystal display panel to the row electrode driver, or there is another method in which the row electrodes are alternately led from opposite sides of the liquid crystal display panel to the row electrode driver due to mounting conditions. In the case where the row electrodes are led from the opposite sides of the liquid crystal display panel to the row electrode driver, the signals are required to be alternately and sequentially applied to the row electrodes disposed at one side of the liquid crystal display panel and the row electrodes disposed at the other side of the liquid crystal display panel. Thus, if the row electrode driver is disposed at one side of the liquid crystal display panel, such inconveniences take place that connections for connecting the liquid crystal display panel and the row electrode driver are required to be extended longer and the wires intersect with each other. This requires that the area required for wiring be large and that the wiring should be performed by using through-holes, thereby posing problems to miniaturization and reliability of the liquid crystal display panel. Furthermore, in the case where two row electrode drivers are, respectively, disposed at the opposite sides of the liquid crystal display panel, one of the row electrode drivers delivers output signals to the cells having odd numbers counted in the shift register, while the other one of the row electrode drivers delivers output signals to the cells having even numbers counted in the shift register. Thus, each of the row electrode drivers uses only a half the parts on the shift register, thereby resulting in disadvantages in miniaturization and power consumption of the liquid crystal display panel. Meanwhile, in this case, since a start pulse signal and a clock signal are required to be applied to each of the shift registers disposed at the opposite sides of the liquid crystal display panel so as to actuate each of the shift registers, the number of input signals becomes large undesirably.

Moreover, in the above described drive types, supposing that character $R_{ON}$ designates the resistance of the transistor at the time of turning on and character $C_{LC}$ designates the capacitance of the liquid crystal layer, a time constant $T_{ON}$ for charging the display picture element electrode is given by the following equation.

$$T_{ON}=R_{ON}\times C_{LC}.$$

It is desirable that the time constant $T_{ON}$ is set far smaller than the scanning time period H such that the display picture element electrodes are sufficiently charged when the electric potential of the display picture element electrodes becomes equal to electric potential of a wave form of data signals. Unless the time constant $T_{ON}$ is far smaller than the scanning time period H, the TFTs will be turned off before the liquid crystal layer is charged to a predetermined electric potential through the TFTs by using a voltage applied to the column electrodes. By turning off early, the TFTs cause aggravation of display characteristics. In addition, in such a state, the voltage applied to the liquid crystal layer varies according to values of the time constant $T_{ON}$. Therefore, if there is a variability in values of the resistance $R_{ON}$ and the capacitance $C_{LC}$ of each of the picture elements in the liquid crystal display panel, its effect becomes apparent in the display contrast and offers a serious problem in display in which half tone is necessary, for example, television picture.

SUMMARY OF THE INVENTION

Accordingly, an essential object of the present invention is to provide a novel and useful drive circuit for use in a liquid crystal display unit, which is small in power consumption and facilitates miniaturization and high integration, with substantial elimination of the disadvantages inherent in conventional drive circuits of this kind.

In order to accomplish this object of the present invention, a drive circuit for use in a matrix type liquid crystal display unit provided with a liquid crystal display panel in which switching elements for addressing are, respectively, provided at picture elements disposed in a matrix type display pattern, embodying the present invention comprises a row electrode driver, for driving row electrodes which apply signals to the switching elements, the row electrode driver can be coupled with not only terminals of the row electrodes provided at one side of said liquid crystal display panel but also to the terminals of the row electrodes provided at opposite sides of said liquid crystal display panel; said row electrode driver being provided with a changeover terminal for setting said row electrode driver to said terminals of said row electrodes provided at the one side of said liquid crystal display panel or said terminals of said row electrodes provided at the opposite sides of said liquid crystal display panel; an initial output signal produced when said row electrode driver has been set to said terminals of said row electrodes provided at the one side of said liquid crystal display panel being so set as to coincide, in timing, with an initial output signal produced when said row electrode driver has been set to said terminals of said row electrodes provided at the opposite sides of said liquid crystal display panel.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
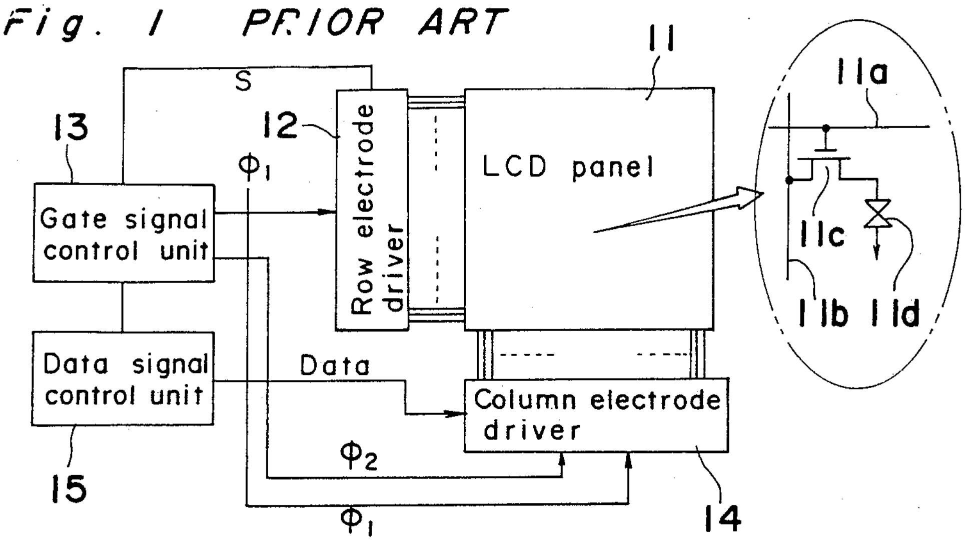
Fig. 1 PRIOR ART
FIG. 1 is a block diagram showing construction of a prior art liquid crystal display unit (already referred to)
Figure 2:
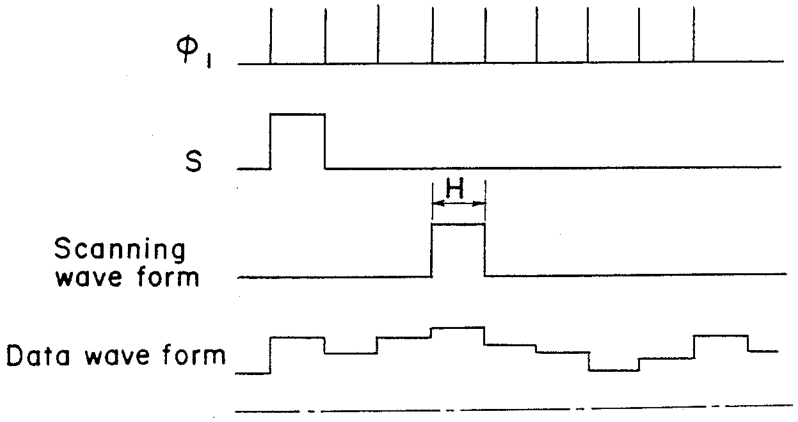
Fig. 2 PRIOR ART
FIG. 2 is a chart showing wave forms of the prior art liquid crystal display unit of FIG. 1 (already referred to)
Figure 3:
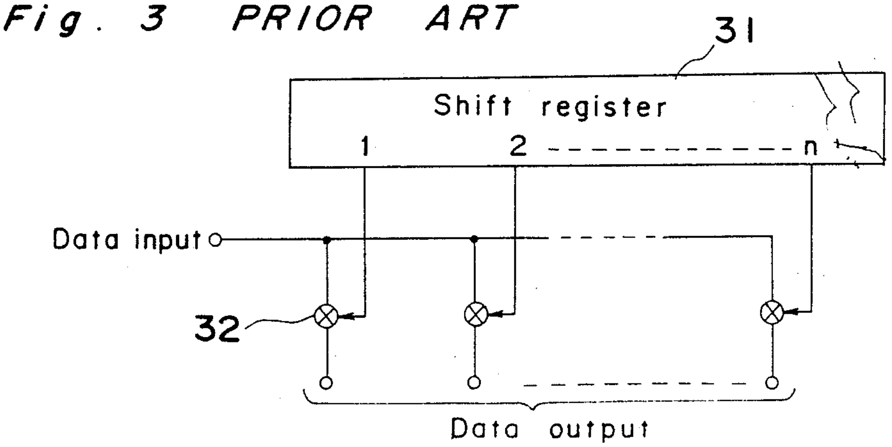
Fig. 3 PRIOR ART
FIG. 3 is a circuit diagram showing a prior art column electrode driver of a panel sample-and-hold drive type (already referred to)
Figure 4:
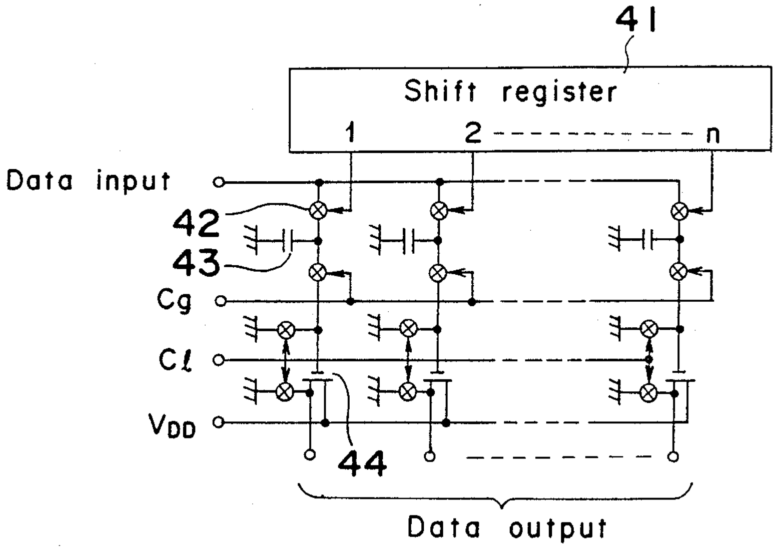
Fig. 4 PRIOR ART
FIG. 4 is a circuit diagram showing a prior art column electrode driver of a driver sample-and-hold drive type (already referred to)
Figure 5:
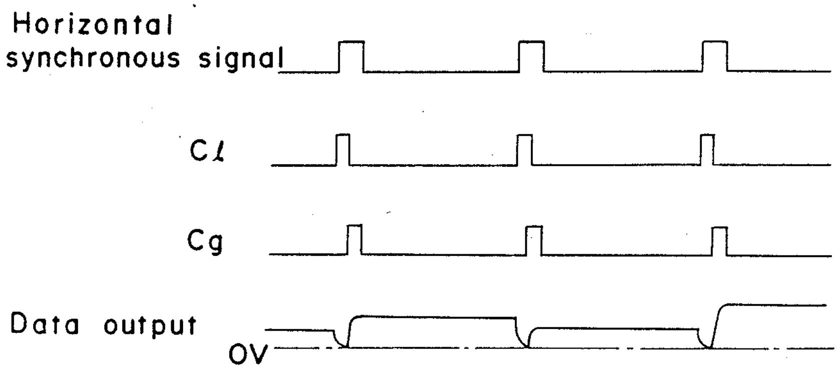
Fig. 5 PRIOR ART
FIG. 5 is a chart showing wave forms of the prior art column electrode driver of FIG. 4 (already referred to)
Figure 6:
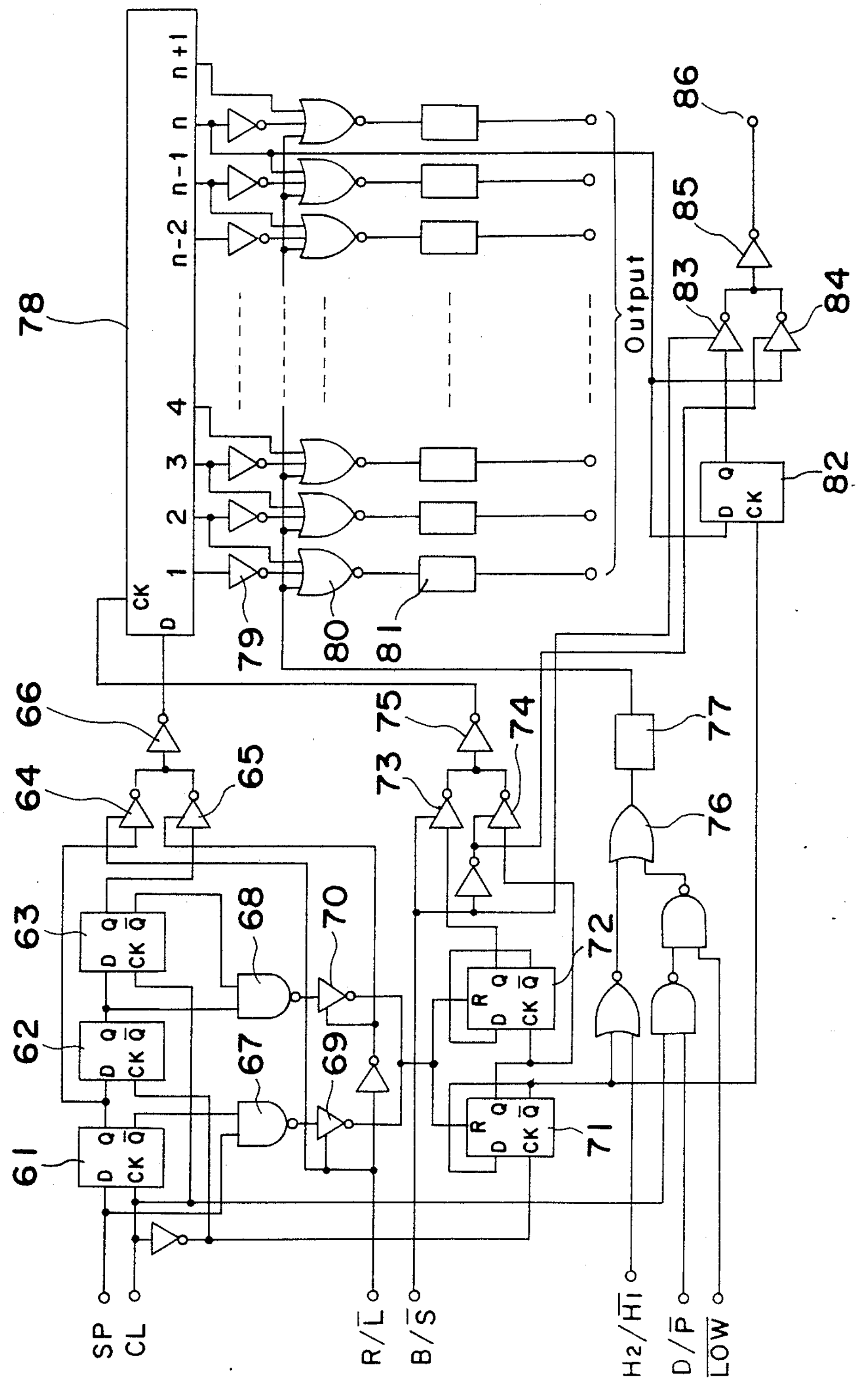
FIG. 6 is a circuit diagram of a row electrode driver according to one preferred embodiment of the present invention.

Hereinbelow, one embodiment in which a drive circuit for use in a liquid crystal display unit, according to the present invention is applied to a liquid crystal television is described with reference to FIGS. 6 to 9. FIG. 6 shows a row electrode driver according to the present invention, which is small in power consumption and facilitates high integration. In the row electrode driver, connection can be made in the case where terminals of row electrodes for transmitting signals to switching elements of a liquid crystal display panel are provided either at one side of a liquid crystal display panel or at opposite sides of the liquid display panel. In the case where the terminals of the row electrodes are provided at one side of the liquid crystal display panel, a terminal $R/\overline{L}$ is set to "0", a terminal $B/\overline{S}$ is set to "0", a terminal $H_2/\overline{H}_1$ is set to "1", a terminal $D/\overline{P}$ is set to "0" and a terminal $\overline{LOW}$ is set to "1".

Figure 7:
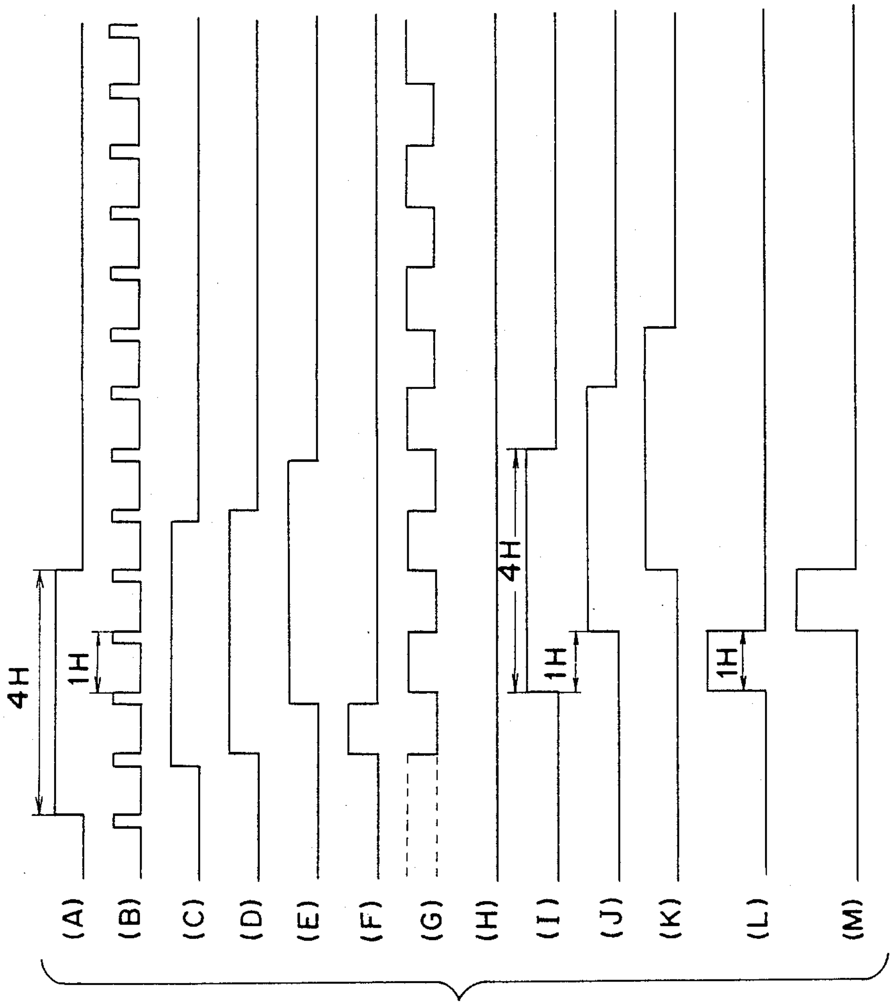
FIG. 7 is a chart showing wave forms of the row electrode driver of FIG. 6, in which row electrodes are led from one side of a liquid crystal display panel to the row electrode driver.

Timing wave forms of the row electrode driver are shown in FIG. 7. A start pulse signal SP (FIG. 7(A)) having a width of 4H and a clock signal CL (FIG. 7(B)) having a period of 1H are applied to a flip-flop 61. An output signal Q (FIG. 7(C)) of the flip-flop 61 is applied to a data terminal of a flip-flop 62 and is triggered at a negative edge of the clock signal CL, so that a signal shown in FIG. 7(D) is obtained. This signal of FIG. 7(D) is further applied to a data terminal of a flip-flop 63 and is triggered at a positive edge of the clock signal, whereby a signal shown in FIG. 7(E) is obtained. The signal of FIG. 7(E) is selected by an inverted tri-state buffer 65 so as to be inputted to a data terminal of a shift register 78 and thus, cells of the shift register 78 are shifted by a half bit. Meanwhile, a NAND signal of the output Q of the flip-flop 62 and the signal $\overline{Q}$ of the flip-flop 63 is generated from a NAND circuit 68 and is selected by an inverted tri-state buffer 70 so as to be inputted to the reset terminals of flip-flops 71 and 72 (FIG. 7(F)). The NAND signal of the NAND circuit 68 resets the flip-flop 71 before the negative edge of the clock signal CL is received the flip-flop 71. Upon receipt of the negative edge of the clock signal CL, the flip-flop 71 produces a signal which has half the frequency, as shown in FIG. 7(G). The signal of FIG. 7(G) is selected by an inverted-tri-state buffer 74 to be inputted to a clock terminal of the shift register 78. Output signals of the shift register 78 are shifted by a half bit relative to the clock signal CL so as to have a pulse width of 4H shifted by 1H from each other as shown in FIGS. 7(I), 7(J) and 7(K).

On the other hand, an output of an OR circuit 76 acts as an ENABLE signal of an output of the row electrode driver and is set to "0" in this embodiment as shown in FIG. 7(H). For example, in the case where the terminal $\overline{\text{LOW}}$ has been set to "0", all outputs of the row electrode driver assume "0". Therefore, LOW acts as a reset switch used at start-up for setting all the outputs at a low level. If this is not done, the outputs of the row electrode drivers are unstable. Reference numeral 77 represents a delay circuit for adjusting timing. An NOR signal, of an inverted signal of the output (FIG. 7(I)) of the first cell of the shift register 78, the output (FIG. 7(J)) of the second cell of the shift register 78 and the ENABLE signal (FIG. 7(H)), is outputted from an NOR circuit 80, as a pulse signal (FIG. 7(L)) subjected to level shift by a level shifter 81, such that the pulse signal of FIG. 7(L) acts as a scanning drive signal being applied to the row electrodes of the liquid crystal display panel. A signal at a terminal 86 is an output of an n-th cell of the shift register 78 and is used to continuously connect a plurality of the row electrode drivers. Thus, when the terminal $R/\overline{L}$ is set to "0", the terminal $B/\overline{S}$ is set to "0", the terminal $H_2/\overline{H_1}$ is set to "1", the terminal $D/\overline{P}$ is set to "0" and the terminal $\overline{\text{LOW}}$ is set to "1", the output of the row electrode driver is continuously shifted, as a pulse having a width of 1H, by one bit. Therefore, this arrangement corresponds to the case in which the row electrodes are led from one side of the liquid crystal display panel to the row electrode driver.

Figure 8:
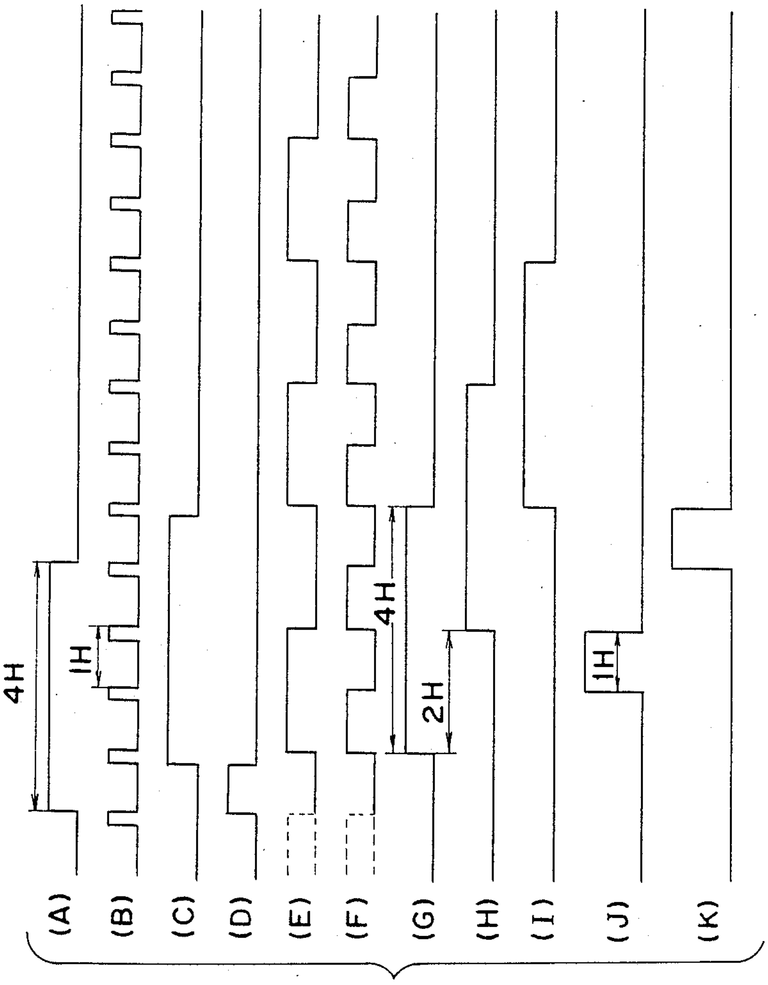
FIG. 8 is a view similar to FIG. 7, in which the row electrode driver of FIG. 6 is set to rightward ones of row electrodes led from opposite sides of a liquid crystal display panel to the row electrode driver.

An arrangement in which the row electrodes are provided at opposite sides of the liquid crystal display panel is described. Initially, in the case where a pair of the row electrodes drivers are set to rightward ones of the row electrodes, the terminal $R/\overline{L}$ is set to "0", the terminal $B/\overline{S}$ is set to "1", the terminal $H_2/H/_1$ is set to "0", the terminal $D/\overline{P}$ is set to "0" and the terminal $\overline{\text{LOW}}$ is set to "1". The D/P terminal controls the pulse width of output. When D/P is set to "0", the pulse width is 1H. If D/P is set to "1", the pulse width is smaller than 1H because the "enable" signal is actuated on the change of state of the clock signal. Timing wave forms of the row electrode driver at this time are shown in FIG. 8. A start pulse signal SP (FIG. 8(A)) having a width of 4H and a clock signal CL (FIG. 8(B)) having a period of 1H are applied to the flip-flop 61. An output signal Q (FIG. 8(C)) of the flip-flop 61 is selected by an inverted tri-state buffer 64 so as to be applied to the data terminal of the shift register 78. Meanwhile, the output $\overline{Q}$ of the flip-flop 61 and the start pulse signal SP are processed by a NAND circuit 67 into an output signal. The output signal of the NAND circuit 67 is selected by an inverted tri-state buffer 69 so as to be applied by the reset terminals of the flip-flops 71 and 72 (FIG. 8(D)). A signal (FIG. 8(E)), which is obtained by dividing the clock signal CL, in frequency, into a quarter by the flip-flops 71 and 72, is selected by an inverted tri-state buffer 73 so as to be inputted to the clock terminal of the shift register 78. Output signals of the shift register 78 are shifted by a half bit so as to have a pulse width of 4H shifted by 2H from each other as shown in FIGS. 8(G), 8(H) and 8(I). An output (ENABLE signal) is produced by the delay circuit 77 as shown in FIG. 8(F). The final signals to be outputted have a pulse width of 1H shifted by 2H from each other as shown in FIGS. 8(J) and 8(K). Namely, these output signals are equivalent to signals of odd numbers or even numbers, which are shifted continuously by 1 bit from each other. A signal at the terminal 86 is obtained by triggering an output of an n-th cell of the shift register 78 at a positive edge of the inverted output of the flip-flop 71. In the case where a plurality of the row electrode drivers are continuously connected to each other, the above described signal of the terminal 86 is applied, as a start pulse signal for a subsequent one of the row electrode drivers, to a terminal SP.

Figure 9:
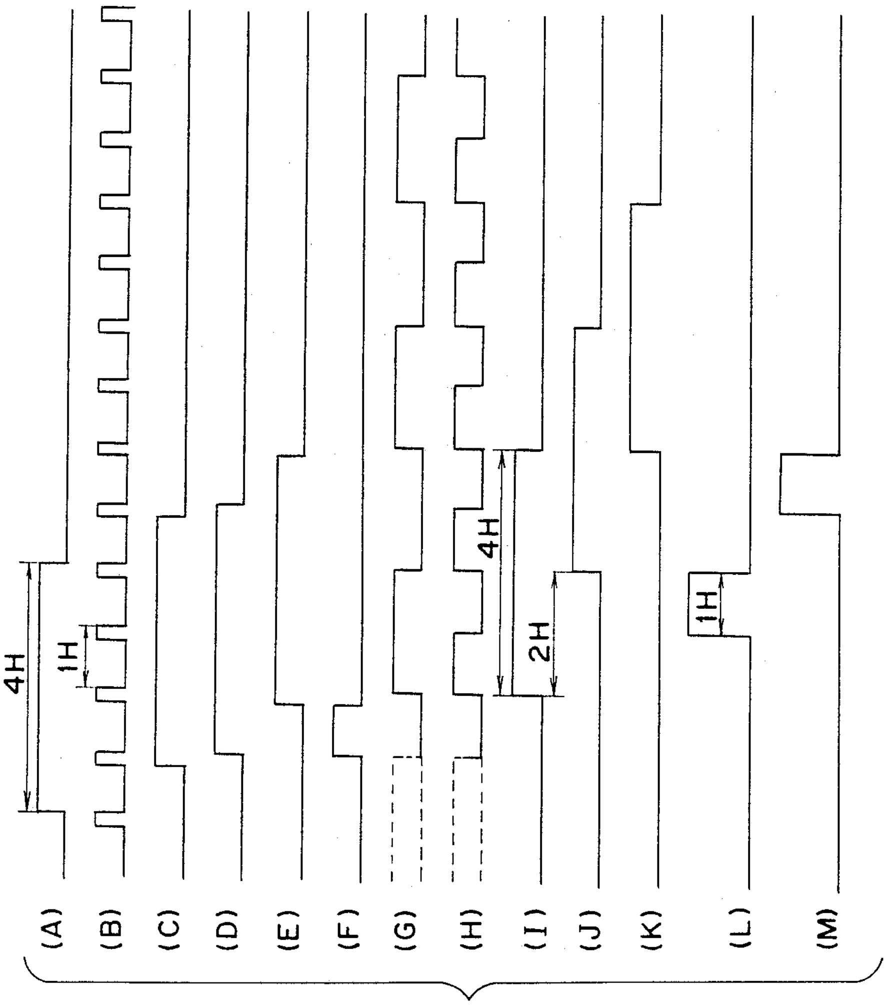
FIG. 9 is a view similar to FIG. 8, in which the row electrode driver is set to leftward ones of the row electrodes led from the opposite sides of the liquid crystal display panel to the row electrode driver.

In the case where the row electrode drivers are set on the left of the row electrodes, the terminals are set in the same manner as in the case of setting the row electrode driver to the rightward ones of the row electrodes except that the terminal $R/\overline{L}$ is set at "0". Timing wave forms of the row electrode driver at this time are shown in FIG. 9. Signals of FIGS. 9(A) to 9(F) are the same as the signals of FIGS. 7(A) to 7(F) for leading the row electrodes from one side of the liquid crystal display panel to the row electrode driver. The signal of FIG. 9(E) to be inputted to the data terminal of the shift register 78 and the signal of FIG. 9(F) to be inputted to the reset terminals of the flip-flops 71 and 72 having a time lag of 1H behind the corresponding signals of FIGS. 8(C) and 8(D), respectively, for setting the row electrode driver to the right of the row electrodes. Subsequent operations of FIGS. 9(G) to 9(M) of the circuit are the same as those of FIGS. 8(E) to 8(K) for setting the row electrode driver to the right of the row electrodes. The final signals to be outputted have a pulse width of 1H shifted by 2H from each other as shown in FIGS. 9(L) and 9(M). Namely, these output signals are equivalent to signals of odd numbers or even numbers, which are shifted continuously by 1 bit from each other. However, an initial pulse appearing in the signals of FIGS. 9(L) and 9(M) has a time lag of 1H behind that in the signals of FIGS. 8(J) and 8(K) for setting the row electrode driver to the right of the row electrodes.

Figure 13:
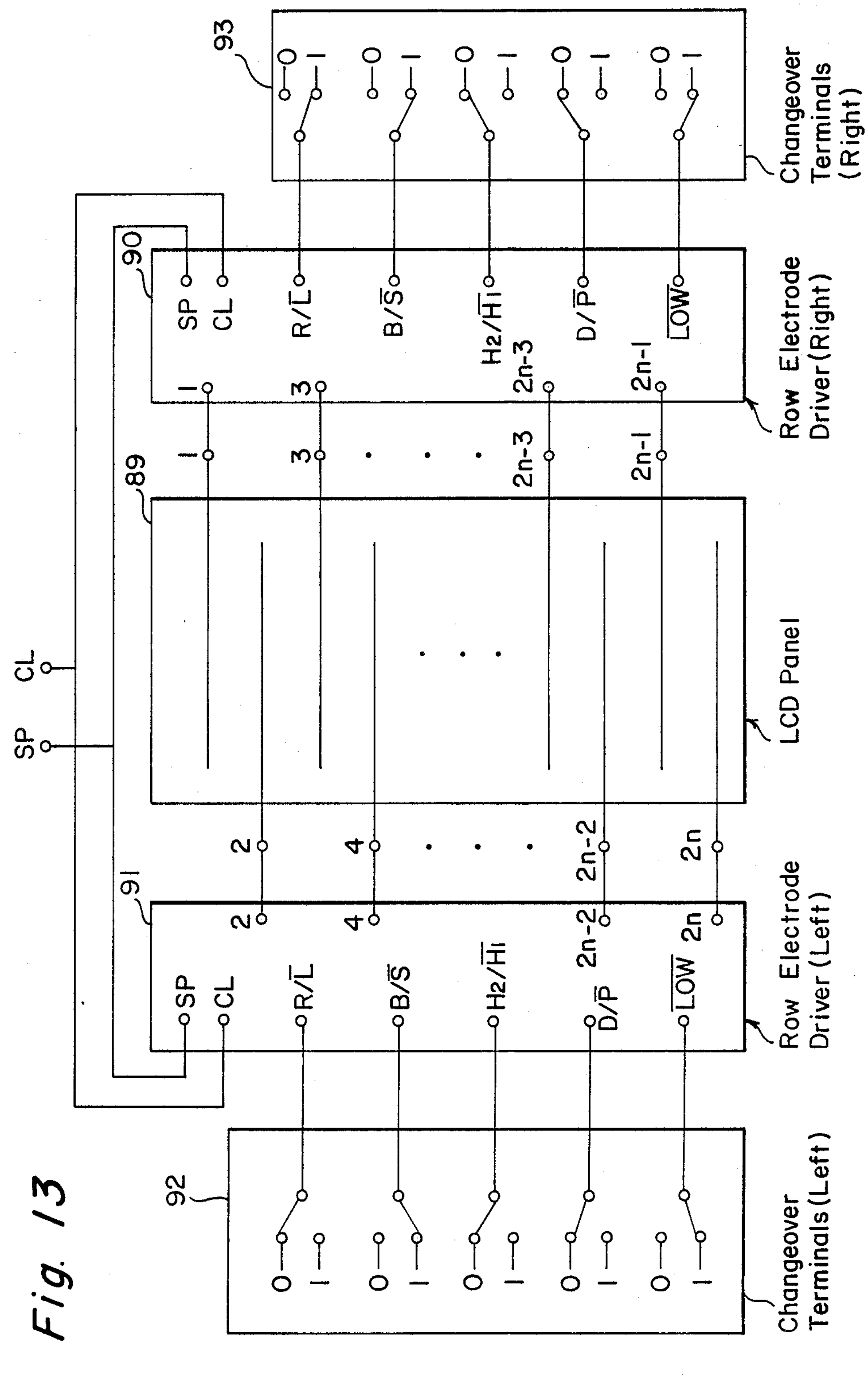
FIG. 13 shows the connection of a preferred embodiment to an LCD with electrodes on opposite sides.

In the case where the terminals of the row electrodes are provided at opposite sides of the liquid crystal display panel (as shown in FIG. 13) and the row electrodes at the opposite sides of the liquid crystal display panel are driven alternately and sequentially, the row electrode drivers for driving the left and right row electrodes, respectively, are provided and are capable of using the single start pulse signal SP and the single clock signal CL in common by merely changing setting of the terminals R/$\overline{L}$ of the row electrode drivers, whereby the row electrodes provided at the opposite sides of the liquid crystal display panel can be alternately driven.

Thus, changeover of the row electrode drivers between the row electrodes at one side of the liquid crystal display panel and at opposite sides of the liquid crystal display is performed by the changeover terminal B/$\overline{S}$. Meanwhile, changeover of the row electrode drivers between setting the row electrode drivers to the right and left of the row electrodes can be performed by the terminal R/$\overline{L}$. In any one of the operations of the row electrode drivers, the row electrodes can be driven by using a common start pulse signal and clock signal. The initial output signal of FIG. 7(L) produced in the case of the row electrodes at one side of the liquid crystal display panel coincides, in timing, with the initial output signal of FIG. 8(J) produced in the case of setting the row electrode drivers to the right of the row electrodes provided at opposite sides of the liquid crystal display panel.

Figure 12:
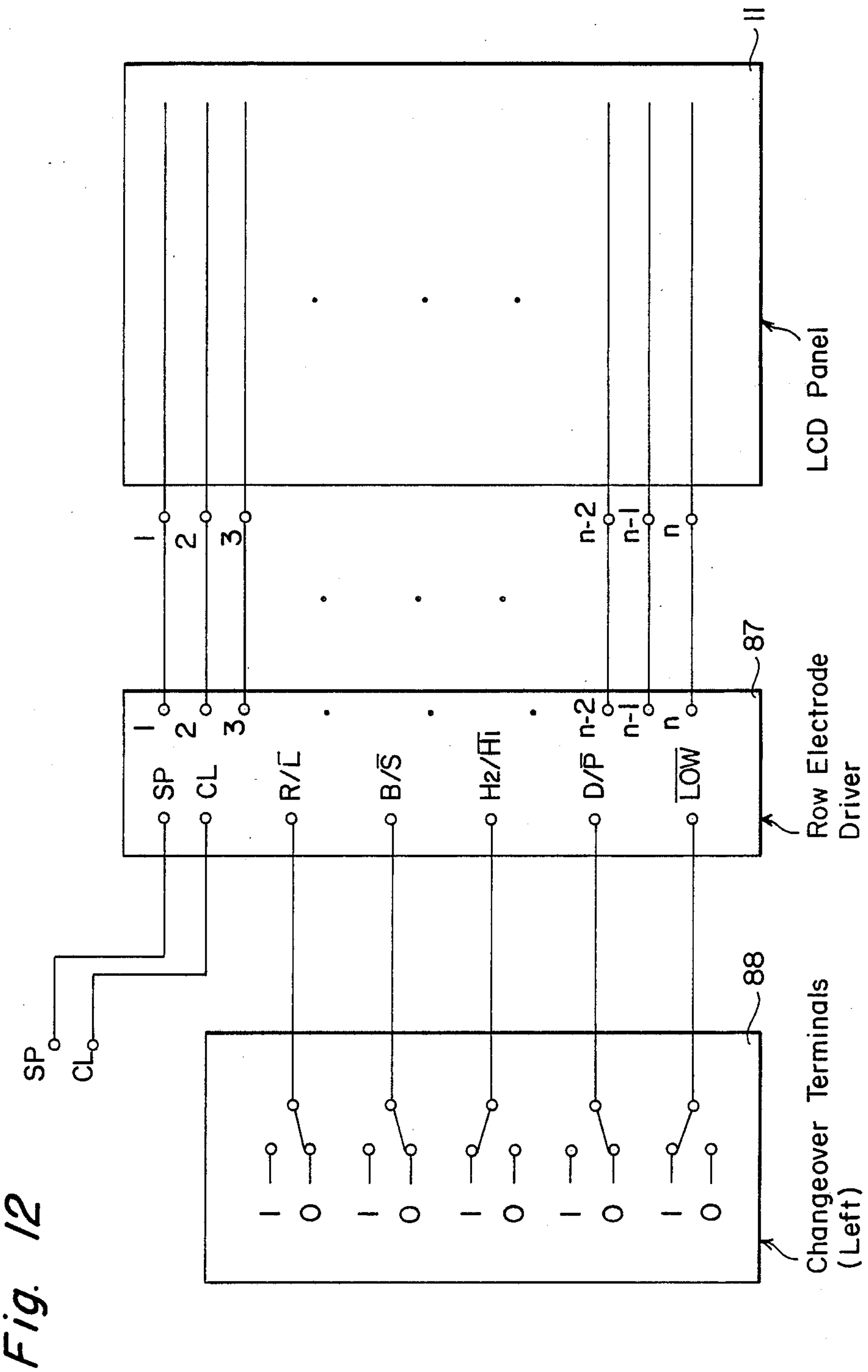
FIG. 12 shows the connection of a preferred embodiment to an LCD with electrodes on one side.

As is clear from the foregoing description, in the drive circuit of the present invention, the row electrode driver is provided with the changeover terminal for changing over the row electrode driver to the row electrodes provided at one side of the liquid crystal display panel as seen in FIG. 12 or the row electrodes provided at opposite sides of the liquid crystal display panel as seen in FIG. 13 whereby both the terminals of the row electrodes provided at one side of the liquid crystal display panel and the terminals of the row electrodes provided at opposite sides of the liquid crystal display panel can be led to the row electrode drivers. Meanwhile, in any one of the cases where the row electrodes at one side of the liquid crystal display panel or where the row electrodes at opposite sides of the liquid crystal display panel, the row electrodes can be driven by using a common start pulse signal and the clock signal. Furthermore, the initial output signal generated in the case of the row electrodes at one side of the liquid crystal display panel can be so set to coincide, in timing, with the initial output signal generated in the case of the row electrodes at opposite sides of the liquid crystal display panel.

Accordingly, by using the row electrode driver of the present invention, the row electrodes can be led either from only one side of the liquid crystal display panel as seen in FIG. 12 or from opposite sides of the liquid crystal display panel to the row electrode driver as seen in FIG. 13 so that the drive circuit used is small in power consumption and enables miniaturization and high integration.

Figure 10:
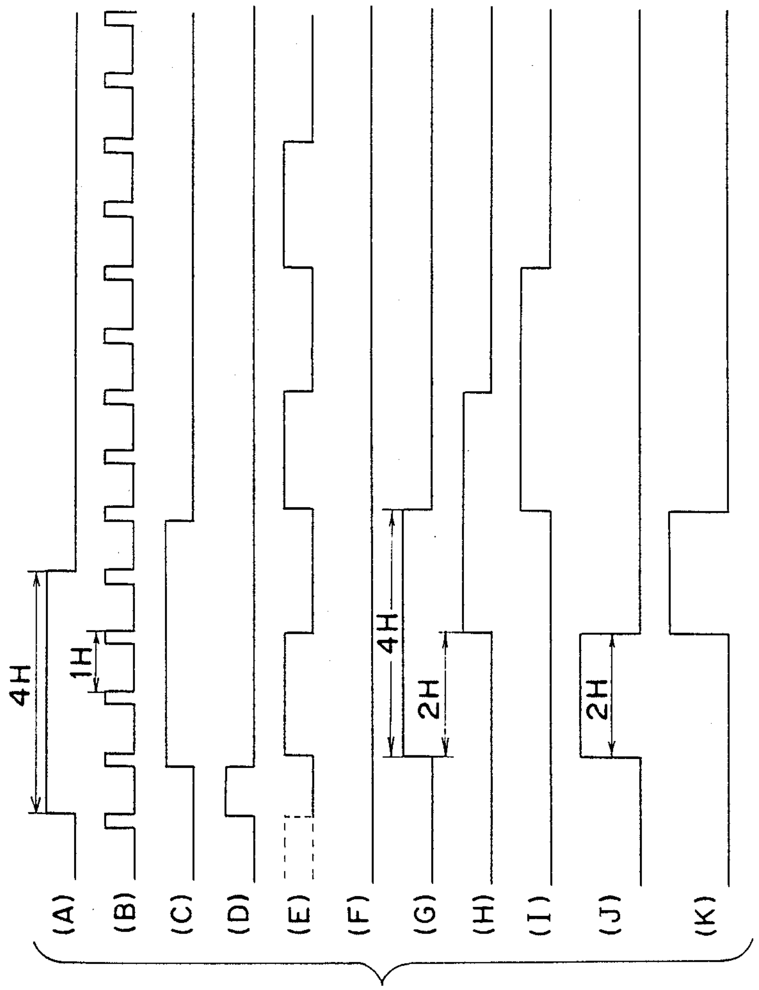
FIG. 10 is a view similar to FIG. 8, particularly showing another embodiment of the present invention.
Figure 11A:
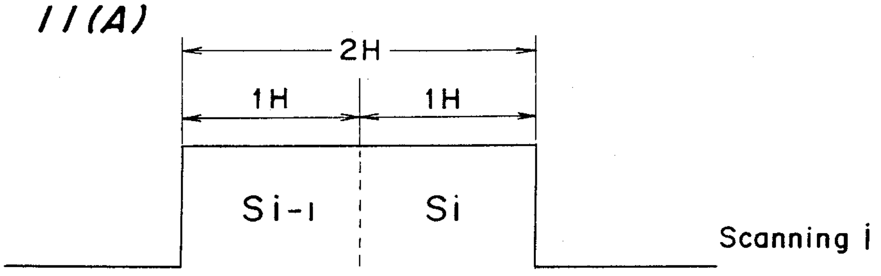
FIG. 11 is a showing wave forms in the embodiment of FIG. 10.
Figure 11B:
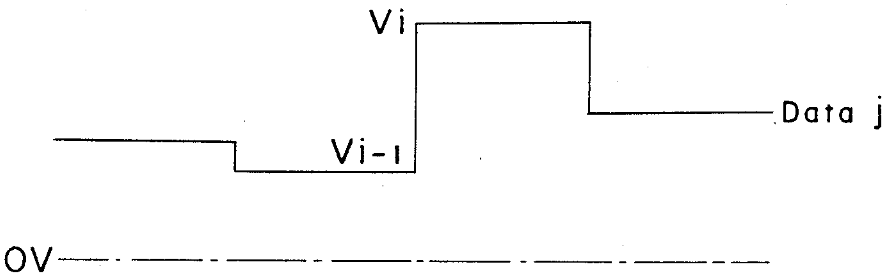
Figure 11C:
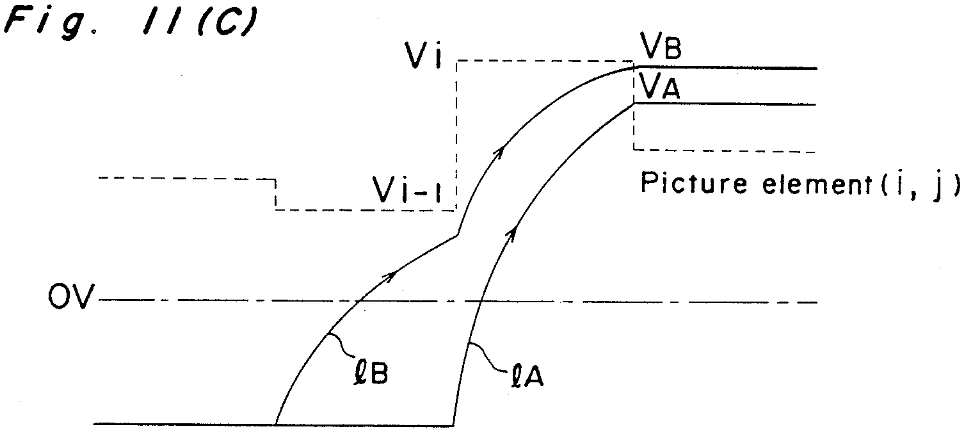

Furthermore, another embodiment of the present invention is described with reference to FIGS. 10 and 11. FIG. 11 shows wave forms explanatory of a basic principle of the present invention. Hereinbelow, a picture element of an i-th row and a j-th column is described by way of example. FIG. 11(A) shows a scanning pulse of an i-th row. This scanning pulse has a width of 2H and is a combination of a known scanning pulse $S_i$ of an i-th row having a width of 1H and a known scanning pulse $S_{i-1}$ of an (i−1)-th row having a width of 1H. FIG. 11(B) shows a wave form of a data signal of a j-th column. Characters $V_{i-1}$ and $V_i$ represent data voltages corresponding to an (i−1)-th row and an i-th row respectively. FIG. 11(C) shows a charging characteristic (curve lB) of a drive method of the present invention in the case where a time constant $T_{ON}$ for charging the display picture element electrodes is not sufficiently small when compared with H. In the prior art drive method, the scanning pulse of the i-th row is represented by $S_i$. The charging characteristic is shown by the curve lA in which charging is performed towards the electric potential of $V_i$. However, since the time constant $T_{ON}$ is not sufficiently small when compared with H, charging is initially performed at the known scanning pulse $S_{i-1}$ towards the electric potential of $V_{i-1}$ and then, is performed at the known scanning pulse $S_i$ towards the essential electric potential of $V_i$. As a result, the charging characteristic of the present invention is performed up to an electric potential $V_B$ higher than an electric potential $V_A$ of the prior art drive method as shown by the curve lB. Thus, in the present invention, since the scanning pulse has the width of 2H wider than the width of 1H of the known scanning pulse, the same effect as halving of the time constant $T_{ON}$ ($=R_{ON}\times C_{LC}$) can be obtained without increasing the pulse width even in the case where the time constant $T_{ON}$ is not sufficiently small when compared with H, with characters $R_{ON}$ and $C_{LC}$ designating a resistance of the transistors at the time of turning on of the transistors and a capacitance of the liquid crystal layer, respectively. Therefore, display will have excellent contrast. Meanwhile, in the case where the width of the scanning pulse is rearwardly increased by 1H over the width 1H of the known scanning pulse so as to assume 2H as a whole, the above described effect can be obtained. However, in this case, display deviates by 1H downwardly.

With reference to FIG. 6, an arrangement is described in which the terminals of the row electrodes are provided at opposite sides of the liquid crystal display panel such that the row electrodes provided at the rightward side of the liquid crystal display panel and the row electrodes provided at the leftward side of the liquid crystal display panel are driven alternately and sequentially. When the row electrode driver is set to the right of the row electrodes such that the output signal has the pulse width of 1H, the terminal R/$\overline{L}$ is set to "1", the terminal B/$\overline{S}$ is set to "1", the terminal $H_2/\overline{H}_1$ is set to "0", the terminal D/$\overline{P}$ is set to "0" and the terminal $\overline{LOW}$ is set to "1". Since timing wave forms of the row electrode driver at this time are the same as those of FIG. 8.

In the case where the row electrode driver is set to the right of the row electrodes such that the output signal has the pulse width of 2H, the terminal R/$\overline{L}$ is set to "1", the terminal B/$\overline{S}$ is set to "1", the terminal $H_2/\overline{H}_1$ is set to "1", the terminal D/$\overline{P}$ is set to "0" and the terminal $\overline{LOW}$ is set to "1". Timing wave forms of the row electrode driver at this time are shown in FIG. 10. Since FIGS. 10(A) to 10(E) are the same as FIGS. 8(A) to 8(E), respectively. When the terminal $H_2/\overline{H}_1$ has been set to "1", the output (ENABLE signal) of the delay circuit 77 becomes "0" as shown in FIG. 10(F). The final signals to be outputted have a pulse width of 2H shifted by 2H from each other as shown in FIGS. 10(J) and 10(K). These output signals precede, by a time period of 1H, the output signals having a pulse width of 1H so as to have the pulse width of 2H. Thus, in the row electrode driver of the present invention, since the scanning pulse width can be set to 1H or 2H by merely changing setting of the terminal $H_2/\overline{H}_1$, display of excellent contrast can be obtained even in the case where the time constant $T_{ON}$ for charging the display picture element electrodes is not far smaller than the horizontal scanning time period H.

As is clear from the foregoing description the drive circuit for use in the liquid crystal display unit is provided with a changeover terminal for setting to one of 1H and 2H the pulse width of the scanning signal applied to the row electrodes of the liquid crystal display panel. The pulse width of 2H is set to precede, by a time period of 1H, the conventional pulse width of 1H. Thus, in accordance with the present invention, a drive method, free from voltage drop or aggravation of display characteristics due to insufficient charging of the display picture element electrodes through the switching transistors, can be established without affecting display positions at all.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A drive circuit for use in a matrix type liquid crystal display unit including a liquid crystal display panel having a plurality of picture elements connected to row and column electrodes and switching elements for addressing said picture elements, the switching elements being provided at said picture elements, comprising:

row electrode driver means, for driving the row electrodes of the matrix type liquid crystal display panel, said row electrodes applying signals to the switching elements;

said row electrode driver means being connectable to either terminals of said row electrodes provided for a single-sided liquid crystal display panel or to terminals of said row electrodes provided for an opposite-sided liquid crystal display panel;

said row electrode driver means including, changeover terminal means for enabling said row electrode driver means to drive said terminals of said row electrodes provided for said single-sided liquid crystal display panel or to drive said terminals of said row electrodes provided for said opposite-sided liquid crystal display panel;

said row electrode driver means producing an initial output signal when said changeover terminal means has been set to indicate that said terminals of said row electrodes provided for said single-sided liquid crystal display panel are being used which is identical to the initial output signal produced when said changeover terminal means has been set to indicate said terminals of said row electrodes provided for said opposite-sided liquid crystal display panel are being used.

2. The drive circuit as claimed in claim 1, wherein when said row electrode driver means being set to drive said terminals of said row electrodes provided for said opposite-sided liquid crystal display panel, a common clock signal is applied to said row electrode driver means.

3. The drive circuit as claimed in claim 1, wherein when said row electrode driver means being set to drive said terminals of said row electrodes provided for said opposite-sided liquid crystal display panel, a common start pulse signal is applied to said row electrode driver means.

4. The drive circuit as claimed in claim 1, wherein when said row electrode driver means being set to drive said terminals of said row electrodes provided for said opposite-sided liquid crystal display panel, a common clock signal and start pulse signal are applied to said row electrode driver means.

5. A drive circuit, for use in a matrix type liquid crystal display unit including a crystal display panel having a plurality of picture elements connected to row and column electrodes and switching elements for addressing said picture elements, the switching elements being provided at said picture elements comprising:

row electrode driver means for alternatively applying a scanning signal having either a pulse width of 1H or a pulse width of 2H to the row electrodes connected to the switching elements, where H denotes a horizontal scanning time period;

said row electrode driver means including, changeover terminal means for setting the pulse width of said scanning signal to either 1H or 2H.

6. A drive circuit for use in a matrix type liquid crystal display unit including a liquid crystal display panel having a plurality of picture elements connected to row and column electrodes and switching elements for addressing said picture elements, the switching elements being provided at said picture elements, comprising:

row electrode driver means, for driving the row electrodes of the matrix type liquid crystal display panel, said row electrodes applying signals to the switching elements;

said row electrode driver means being connectable to either terminals of said row electrodes provided for a single-sided liquid crystal display panel or to terminals of said row electrodes provided for an opposite-sided liquid crystal display panel;

said row electrode driver means including, changeover terminal means for enabling said row electrode driver means to drive said terminals of said row electrodes provided for said single-sided liquid crystal display panel or to drive said terminals of said row electrodes provided for said opposite-sided liquid crystal display panel;

said row electrode driver means producing an initial output signal when said changeover terminal means has been set to indicate that said terminals of said row electrodes provided for said single-sided liquid crystal display panel are being used which is identical to the initial output signal produced when said changeover terminal means has been set to indicate said terminals of said row electrodes provided for said opposite-sided liquid crystal display panel are being used;

said row electrode driver means alternatively applies either a first scanning signal having a pulse width of 1H or a second scanning signal having a pulse width of 2H, to said row electrodes, where H denotes a horizontal scanning time period;

said changeover terminal means selecting either said first or second scanning signal.

* * * * *